March 17, 1953     O. P. PIERSON     2,631,627
APPARATUS FOR PEELING VEGETABLES AND FRUITS
Original Filed June 14, 1943
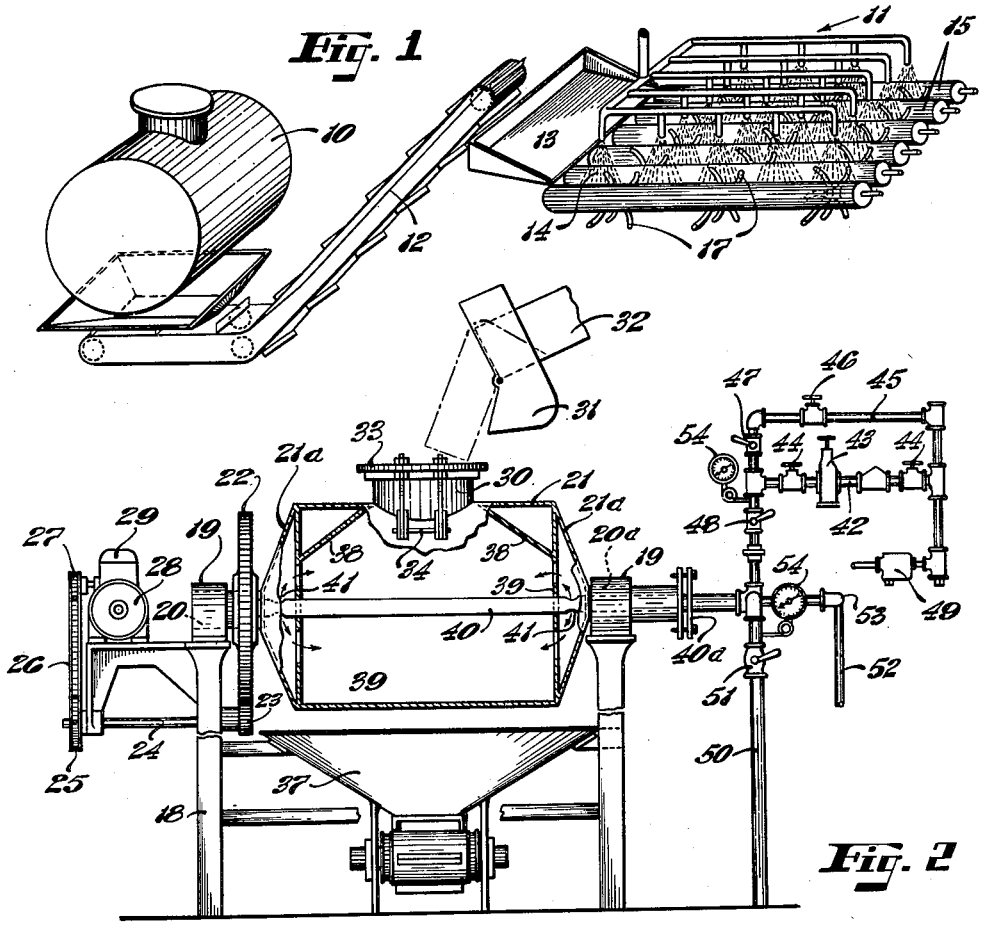
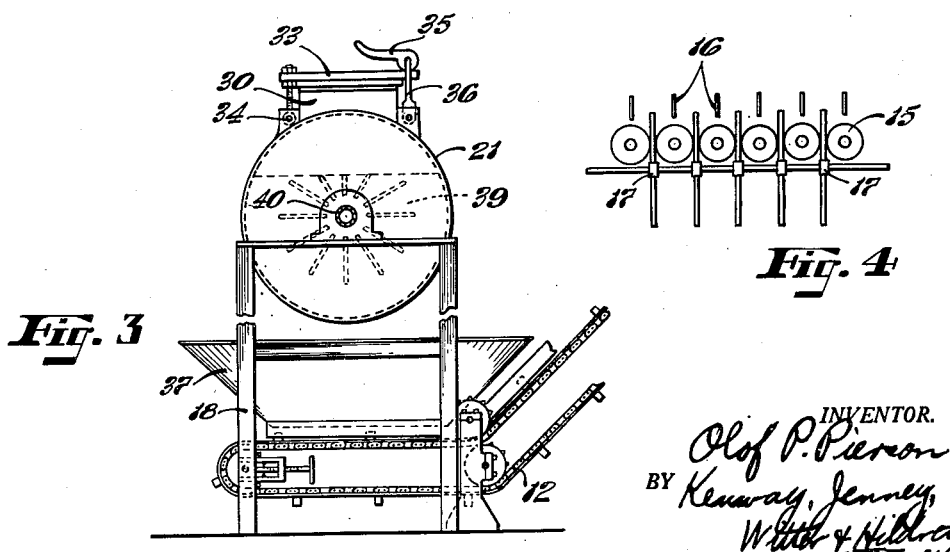
INVENTOR.
Olof P. Pierson
BY Kenway, Jenney, Witter & Hildreth
Attorneys Patented Mar. 17, 1953

2,631,627

UNITED STATES PATENT OFFICE 2,631,627

APPARATUS FOR PEELING VEGETABLES AND FRUITS

Olof P. Pierson, Caribou, Maine

Original application June 14, 1943, Serial No. 490,784. Divided and this application August 27, 1948, Serial No. 46,416

4 Claims. (Cl. 146—43)

The present invention relates to apparatus for peeling vegetables and fruits, and is particularly concerned with the peeling of tubers and root crops, of which potatoes, beets and carrots may be taken as examples. This application is a division of my prior application, Serial No. 490,784 filed June 14, 1943, now abandoned.

When potatoes are to be prepared in quantity, as for food manufacturing operations or in restaurants, the removal of the skins presents a difficult problem. Various attempts at automatic removal of skins have been proposed, such as chemical (lye) treatments and methods involving abrasive action. The chemical methods have obvious disadvantages, and the abrasive methods are unsuitable for potatoes of irregular shapes in that they cannot succeed in loosening the skin in the neighborhood of eyes or indentations; furthermore they necessarily cause excessive wastage of edible portions of the potatoes.

The principal object of the present invention is to present a simple, effective, and economical apparatus for removing the skins from potatoes and other vegetables and fruits. Since potatoes present the most difficult problems, in view of irregularities in shape and size and the tenacity of the skin, the following description will be largely set forth in terms of potato peeling, but it will be understood that it may be applied to other food products for which generally similar conditions prevail.

With this object in view, the principal feature of the present invention contemplates that the potatoes be subjected to the following steps: (1) exposure to high-pressure steam in a pressure chamber for a short time, and (2), spreading in a single layer to be subjected to a high velocity water spray. The brief exposure to high pressure serves to effect such a conversion of the body of the potato in the layer immediately subjacent to the skin as to cause a loosening of the bond between the skin and the potato proper. The principal feature of this step of the present invention resides in subjecting the potato to high temperature and moisture for a very short time, sufficient to loosen the skin, but insufficient for heat to penetrate the potato and cause softening of its interior. It has been found that steam at a pressure of at least 40 pounds per square inch gauge is entirely satisfactory and that with this pressure the potato may be subjected to the treatment for only about 30 to 45 seconds. If steam at a lower pressure were used, a correspondingly longer period would be required to loosen the skin and this would result in cooking of the interior portion, with consequent loss of edible portions of the potato in the subsequent spraying operation. It is well known that some cooking operations, such as boiling, tend to soften the skin, whereas dry cooking (baking) tends to toughen and harden it. The present invention, however, is not concerned with any operations of the kind usually considered as "cooking," since the object and effect of cooking are to soften the meat of the potato to render it edible, while the present invention seeks to prevent softening of the meat, except perhaps in a very small layer immediately beneath the skin.

Following the steam treatment, high velocity water sprays are used to remove the softened and loosened skin, the potatoes being first spread in a single layer while being conveyed to a discharge point. It is imperative that the spraying operation be conducted with the potatoes in a single layer in order that some of the potatoes will not mask or block the others. It is furthermore essential that potatoes be continuously turned during this operation to present all portions of their exterior surfaces to the spray. In view of the variation in sizes of potatoes, the conveying means is preferably such as will effect the movement of the potatoes to the discharge point and their simultaneous turning motion without requiring adjustments for size. A feature of the present invention contemplates apparatus which accomplishes this result with potatoes of substantially any size and character.

In the accompanying drawings, I have shown apparatus from which the full nature of my invention and its many novel features and advantages will be readily apparent.

In the drawings Fig. 1 is a schematic view of apparatus in accordance with my invention; Fig. 2 is a partly sectioned side view of one embodiment of skin treating apparatus in accordance with my invention; Fig. 3 shows the apparatus of Fig. 2 in end view; Fig. 4 is a fragmentary view of the skin removing apparatus shown in Fig. 1 to illustrate parts eliminated to simplify Fig. 1.

In accordance with my invention, I employ a pressure chamber 10 in which the potatoes or other objects are treated by steam under pressure, a skin removing unit 11, and means such as the conveyor 12 to carry the objects from the chamber 10 to the unit 11.

The potatoes are introduced into the chamber 10 and are there subjected to steam under pressure for a predetermined time, and while exposed to the steam, they are continuously tumbled to effect the exposure of all of their surfaces to the steam. The pressure and temperature of the steam and the time of exposure of the objects thereto are inter-related with respect to the particular type of vegetable being treated and its condition. Practical operating pressures may be in the order of forty pounds gauge pressure per square inch and with such a pressure satisfactory results may be obtained with the time of exposure being in the order of forty-five seconds. With relatively new potatoes, the time of exposure may be further limited and I have obtained good results in twenty to thirty seconds.

Because of the relative shortness of time required in accordance with my invention, the upper limits of pressure are determined by what is economical in a given set-up.

After the objects have been exposed to the steam, the pressure is released and the potatoes are discharged in a single layer on the conveyor 12 and carried to the hopper 13 of the peeling unit 11 in which they are subjected to the liquid sprays 14. The sprays 14 are of sufficient force to remove the skins of the thus treated potatoes. The potatoes are supported in the unit 11 by adjacent portions of adjacent closely spaced rolls 15. As shown in Fig. 4, partitions 16 serve to hold the potatoes or other objects in contact with the rolls so that each two adjacent rolls may be regarded as defining a path for the potatoes. At least one and preferably both rolls defining each path are positively rotated. Where both rolls are positively rotatable, they may be driven at different speeds and in different directions. While their primary function is to rotate the potatoes relatively rapidly, they may also have an abrading action due to the relative rates of rotation of the rolls, the type of covering for the rolls, or both.

The potatoes are advanced along their paths as by impellers 17, the fingers of which are sufficiently narrow and rigid to pass between the rolls and advance the potatoes at a uniform rate with a tumbling action. Preferably, the impellers 17 rotate slowly in relation to the speed of the rolls so that while the potatoes are exposed thoroughly and uniformly to the action of the sprays, they are rotated sufficiently rapidly to avoid injury of the potatoes by the force of the spray.

The apparatus 10 in which the potatoes are subject to the steam may be of the batch type as shown in Figs. 2 and 3.

As shown in Figs. 2 and 3, the apparatus may consist of a frame 18 having alined bearings 19 in which the spindles 20, 20ª on the ends of the retort 21 are journalled. A gear 22 fast on the spindle 20 meshes with a pinion 23 on the shaft 24 journalled in the frame 18. The shaft 24 has a sprocket 25 connected by a chain 26 to the sprocket 27 driven by the motor 28 through a speed reducing unit 29 associated with which is a control unit 29ª which may be a timing unit or may be manually operated.

The retort 21 has a hopper feed 30 adapted to receive the potatoes from the loader 31 on the discharge end of the feed 32, which may be a conveyor, chute, or the like. The hopper 30 has a cover 33 hinged as at 34 to the retort 21 and the cover is adapted to be clamped tightly thereto by locking cams 35 carried on support 36 pivotally connected to the retort 21.

The frame 18 supports a discharge hopper 37 through which the potatoes or other objects discharged from the retort 21 are fed onto the conveyor 12. The hopper 37 is spaced sufficiently below the retort 21 to permit it to be rotated with the cover open. The locking cams 35 may be released as the retort rotates when they are accessibly positioned and the cover then opens under the influence of gravity on continued rotation of the retort to permit the potatoes to be dumped into the hopper 37. I form the retort 21 with walls 38 to establish a discharge chute.

The pressure retort has its end walls 21ª tapering outwardly towards the spindles 20, 20ª, and I employ apertured partitions 39 to separate the end portions of the retort 21 from the potato receiving part thereof. A steam pipe 40 which may serve as a brace for the retort extends through the spindle 20ª, through the bearing 19, and to the opposite end of the retort 21 and is sealed externally of the retort 21 by a suitably packed joint 40ª. Steam ports 41 discharge steam into the steam receiving chambers defined by the retort ends 21ª and the partitions 39. The partitions 39 maintain potatoes, skins and the like remote from the steam ports 41 as the ports might become clogged thereby. This construction also has the advantage of ensuring that the force of the admitted steam is dissipated before it contacts the potatoes.

Steam from any suitable source is admitted to the pipe 40 by suitable means such as shown in Fig. 2. Such means consists of a main delivery conduit 42 having therein a reduction valve 43 and shut-off valves 44 and a bypass conduit 45 for use if a more rapid pressure build-up in the retort 21 is desired. The bypass conduit 45 has a shut-off valve 46 and a valve 47 of the "whistle" type which permits quick and easy operation. A like valve 48 is disposed to quickly and easily control the delivery of steam through the main delivery conduit 42. I have indicated at 49 a conventional steam trap in the steam delivery system.

The exhaust system consists of a main exhaust conduit 50 controlled by a "whistle" valve 51 and of sufficient size to permit the pressure in the retort to be relieved quickly. The exhaust system also includes a parallel conduit 52 controlled by a pressure relief valve 53 ensuring the maintenance of desired pressure in the retort 21 until the delivery system is shut off and the exhaust valve 51 is opened. Steam pressure gauges are shown at 54.

The operation so far as understood, is described as follows: The potatoes are subjected in the retort 10 to the action of the high pressure steam. Since steam at forty pounds per square inch gauge pressure has a temperature of about 287° F., the exterior portions of the potatoes are immediately subjected to an intense superficial moist heat. The action is not fully understood, but it is believed to depend to some extent on hydrolysis in the skin and in a very thin layer just beneath the skin. The use of steam is essential for hydrolysis, as distinguished from the use of dry heat which would tend to toughen the skin. Also, as heretofore noted, treatment at superatmospheric pressure is essential since at lower pressures and temperatures the treatment must be prolonged to such an extent that the heat will penetrate into the interior and will therefore effect a substantial cooking of the meat with the result that under later action by the water spray, a considerable portion of the meat will be carried away.

During the steam treating operation the retort is slowly rotated. This causes a tumbling action of the potatoes. The tumbling action results in some abrasion of the skin by reason of contact between the potatoes themselves. The skin removal in this stage is, however, not complete and cannot be made complete without holding the potatoes at high temperature for too long a time. The object of the tumbling is primarily to insure that all of the potatoes are uniformly subjected to the steam treatment.

In general the pressure (and hence the steam temperature) should be as high as possible consistent with safe and economical design of the equipment. An increase in pressure requires a reduction of exposure time and it is apparent that the shorter the time of exposure the less will be the penetration of heat into the interior. For some grades of potatoes, which have a particularly tough and tenacious skin, the exposure time will necessarily be longer than for new potatoes with tender skin. It is impossible to state the optimum temperature and time condition for all cases in view of these variations, but in any case the highest available pressure (and hence temperature) is to be used, the exposure time is readily determined as that which will effect the desired superficial action, without substantial softening of the interior portions.

The potatoes after having been subjected to the action of the steam are dumped on to the conveyor 12 and carried into the peeling unit 11 wherein, as heretofore noted, they are spread into a single layer and conveyed through the apparatus. It will be observed that adjacent rolls 15 serve to define the path of advancing movement of the potatoes while continuously turning or rotating them. Furthermore, the potatoes, during the advancing and turning movements, are freely supported by the rolls; by this is meant that the potatoes are mainly supported from beneath, and are not engaged by any side belts or other holding means that might impede or obstruct the sprays, or might require adjustment for size. By spreading out into a single layer on the unit 11, the potatoes are individually advanced by the impellers 17 and are turned over and over by the action of the rolls 15. This advancing and turning operation takes place regardless of the size or type of the potatoes themselves. The water spray should be a high-velocity spray in order to effect substantial removal of the skin and also to dig out the skin from the indentations or eyes. For this reason the water spray should be under a fairly high pressure, say from sixty to eighty pounds per square inch.

It has been found that the present invention results in substantial removal of skin even from potatoes of unusual shapes, such as dumbbell shapes which are sometimes encountered. The invention is also applicable to other tubers and to root crops such as beets and carrots and even to some fruits which have a firm meat, for example, apples. In any case the invention contemplates the softening and loosening of the skin by conversion of the immediately subjacent layer without substantial penetration of heat into the interior followed by the eroding action of high-velocity water sprays while the vegetables are being conveyed in a single layer toward a discharge point, and simultaneously are being continuously rotated to present all portions of their exterior surfaces to the spray.

Having thus described my invention, I claim:

1. In apparatus for treating skin-covered articles of food to loosen the bond between their skins and their subjacent portions, a drum to receive the articles, means for rotating said drum to tumble the articles therein, a transverse partition wall extending across said drum near an end thereof and together with the side and the adjacent end wall of the drum providing a steam chamber in said end of the drum separate from the article-accommodating portion of the drum, a steam supply pipe extending substantially centrally of said drum into said chamber and having at least one lateral opening for discharge of steam laterally into said chamber, said partition wall having therein only small openings for the admission of steam from said chamber into the article-accommodating portion of the drum, thereby to insure dissipation of the force of the steam prior to its contact with the articles.

2. Apparatus as set forth in claim 1 in which the end wall of the drum defining the outer end of the steam chamber is inclined in a direction to deflect the steam delivered laterally into said chamber toward the partition wall defining the inner end of said chamber.

3. In apparatus for treating skin-covered articles of food to loosen the bond between their skins and their subjacent portions, a drum to receive the articles, means for rotating said drum to tumble the articles therein, a transverse partition wall extending across said drum near each end thereof and thereby providing in each end of said drum a steam chamber separate from the medial article-accommodating portion of the drum, a steam supply pipe extending substantially axially of said drum and having lateral openings for discharge of steam laterally into each of said chambers, said partition walls having therein only small openings for the admission of steam from said chambers into the article-accommodating central portion of said drum, thereby to insure dissipation of the force of the steam prior to its contact with the articles.

4. Apparatus as set forth in claim 3 in which the end walls of the drum are inclined in directions to deflect the steam delivered laterally into the steam chambers toward the partition walls defining the inner ends of said chambers.

OLOF P. PIERSON.

REFERENCES CITED

The following references are of record in the file of this patent:

UNITED STATES PATENTS

| Number | Name | Date |
|---|---|---|
| 117,271 | Fitts | July 25, 1871 |
| 695,102 | Griswold | Mar. 11, 1902 |
| 695,330 | McCaslin | Mar. 11, 1902 |
| 746,530 | Latchford | Dec. 8, 1903 |
| 842,378 | Baker | Jan. 29, 1907 |
| 951,452 | Prims | Mar. 8, 1910 |
| 1,012,046 | Anderson | Dec. 19, 1911 |
| 1,237,623 | Dunkley | Aug. 21, 1917 |
| 1,288,205 | Rossi | Dec. 17, 1918 |
| 1,317,898 | Shepard | Oct. 7, 1919 |
| 1,325,847 | Horst | Dec. 23, 1919 |
| 1,433,928 | Baxter | Oct. 31, 1922 |
| 1,438,467 | Walden | Dec. 12, 1922 |
| 1,448,520 | Castruccio | Mar. 13, 1923 |
| 1,513,195 | Stevens | Oct. 28, 1924 |
| 1,669,263 | Pugh | May 8, 1928 |
| 1,753,902 | Neville | Apr. 8, 1930 |
| 1,948,884 | Patterson | Feb. 27, 1934 |
| 1,984,237 | Southan | Dec. 11, 1934 |
| 2,001,703 | Brown | May 21, 1935 |

(Other references on following page)

UNITED STATES PATENTS

| Number | Name | Date |
|---|---|---|
| 2,021,970 | Urschel | Nov. 26, 1935 |
| 2,072,598 | Kile | Mar. 2, 1937 |
| 2,083,293 | Champlin | June 8, 1937 |
| 2,086,539 | DeButhune | July 13, 1937 |
| 2,139,180 | Urschel | Dec. 6, 1938 |
| 2,199,088 | Fauth | Apr. 30, 1940 |
| 2,249,787 | Savage | July 22, 1941 |

FOREIGN PATENTS

| Number | Country | Date |
|---|---|---|
| 7,944 | Austria | June 25, 1902 |
| 79,723 | Germany | Feb. 20, 1895 |
| 624,375 | France | Apr. 2, 1927 |